United States Patent
Orcutt et al.

(10) Patent No.: US 10,427,207 B2
(45) Date of Patent: Oct. 1, 2019

(54) ACTIVATION ASSEMBLY FOR A PRESS APPARATUS

(71) Applicant: Eaton Corporation, Cleveland, OH (US)

(72) Inventors: Eric D. Orcutt, Murfreesboro, TN (US); Ryan Thomas Ellerbrock, Continental, OH (US)

(73) Assignee: EATON INTELLIGENT POWER, LTD., Dublin (IE)

( * ) Notice: Subject to any disclaimer, the term of this patent is extended or adjusted under 35 U.S.C. 154(b) by 379 days.

(21) Appl. No.: 15/059,713

(22) Filed: Mar. 3, 2016

(65) Prior Publication Data

US 2016/0256914 A1    Sep. 8, 2016

Related U.S. Application Data (60) Provisional application No. 62/127,314, filed on Mar. 3, 2015.

(51) Int. Cl.
| | |
|---|---|
| *F16P 3/00* | (2006.01) |
| *B21D 55/00* | (2006.01) |
| *B21D 39/04* | (2006.01) |
| *H01H 3/02* | (2006.01) |
| *H01R 43/048* | (2006.01) |
| *B30B 1/00* | (2006.01) |

(52) U.S. Cl.
CPC ........... *B21D 55/00* (2013.01); *B21D 39/046* (2013.01); *B21D 39/048* (2013.01); *B30B 1/00* (2013.01); *F16P 3/001* (2013.01); *H01H 3/02* (2013.01); *H01R 43/048* (2013.01); *Y10T 29/53065* (2015.01); *Y10T 29/5367* (2015.01); *Y10T 29/53996* (2015.01)

(58) Field of Classification Search
CPC .... B21D 55/00; B21D 39/048; B21D 39/046; H01R 43/048; F16P 3/001; H01H 3/02; B30B 1/00; Y10T 29/53996; Y10T 29/5367; Y10T 29/53065

See application file for complete search history.

(56) References Cited

U.S. PATENT DOCUMENTS

| | | | |
|---|---|---|---|
| 2,962,633 A | 11/1960 | Raymond | |
| 4,412,268 A | 10/1983 | Dassow | |
| 4,625,539 A * | 12/1986 | Brooks | B21D 39/04 29/237 |
| 5,235,217 A | 8/1993 | Kirton | |
| 5,265,217 A * | 11/1993 | Koukoutsis | H03H 17/0288 704/200 |
| 5,796,571 A | 8/1998 | Wetzel et al. | |
| 5,856,646 A | 1/1999 | Simon | |

(Continued)

*Primary Examiner* — Sarang Afzali
*Assistant Examiner* — Ruth G Hidalgo-Hernandez
(74) *Attorney, Agent, or Firm* — Jarett D. Millar (57) ABSTRACT

A press apparatus includes a press assembly and an activation assembly. The press assembly includes a plurality of dies. The plurality of dies defines a center opening for receiving a work piece. The central opening defines a central longitudinal axis. The activation assembly is adapted to actuate the press assembly. The activation assembly includes a first switch and a second switch. The second switch includes a capacitive touch surface that faces in a direction toward the central longitudinal axis of the press assembly.

10 Claims, 10 Drawing Sheets

(56) References Cited

U.S. PATENT DOCUMENTS 7,762,804 B1 * 7/2010 Stupecky .......... A61M 25/1038
                                                    425/392
8,752,261 B2 * 6/2014 Van Sciver ............. A61F 2/958
                                                    29/272

* cited by examiner

ACTIVATION ASSEMBLY FOR A PRESS APPARATUS

CROSS REFERENCE TO RELATED APPLICATION

The present application claims a benefit to U.S. Patent Application Ser. No. 62/127,314, titled "Activation Assembly for a Press Apparatus" and filed on Mar. 3, 2015, the disclosure of which is hereby incorporated by reference in its entirety.

BACKGROUND

Hydraulic press-type machines are used for many different purposes in industry. Press-type machines can apply significant amounts of force to work pieces in order to manipulate the work piece in a given way. Given the significant amounts of force that can be applied, safety of the operator is a concern when press-type machines are being used.

SUMMARY

An aspect of the present disclosure relates to a press apparatus. The press apparatus includes a press assembly and an activation assembly. The press assembly includes a plurality of dies. The plurality of dies defines a center opening for receiving a work piece. The central opening defines a central longitudinal axis. The activation assembly is adapted to actuate the press assembly. The activation assembly includes a first switch and a second switch. The second switch includes a capacitive touch surface that faces in a direction toward the central longitudinal axis of the press assembly.

Another aspect of the present disclosure relates to a crimp machine that is adapted to crimp a hose assembly. The crimp machine includes a press assembly and an activation assembly. The press assembly includes a plurality of dies. The plurality of dies defines a central opening adapted to receive a hose assembly. The activation assembly is adapted to actuate the press assembly. The activation assembly includes a first switch and a second switch. The press assembly is actuated when the second switch is actuated while the first switch is being actuated. The second switch includes a touch surface that faces in the direction of the hose assembly when the hose assembly is disposed in the central opening of the plurality of dies.

Another aspect of the present disclosure relates to a method of operating a press apparatus. The method includes inserting a work piece into a center opening of a press assembly. The work piece is held at a location offset from the center opening of the press assembly using an operator's first hand. A first switch of the press apparatus is actuated using an operator's second hand. A second switch of the press apparatus is actuated with the operator's first hand while holding the work piece. The second switch is actuated while the first switch is being actuated.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
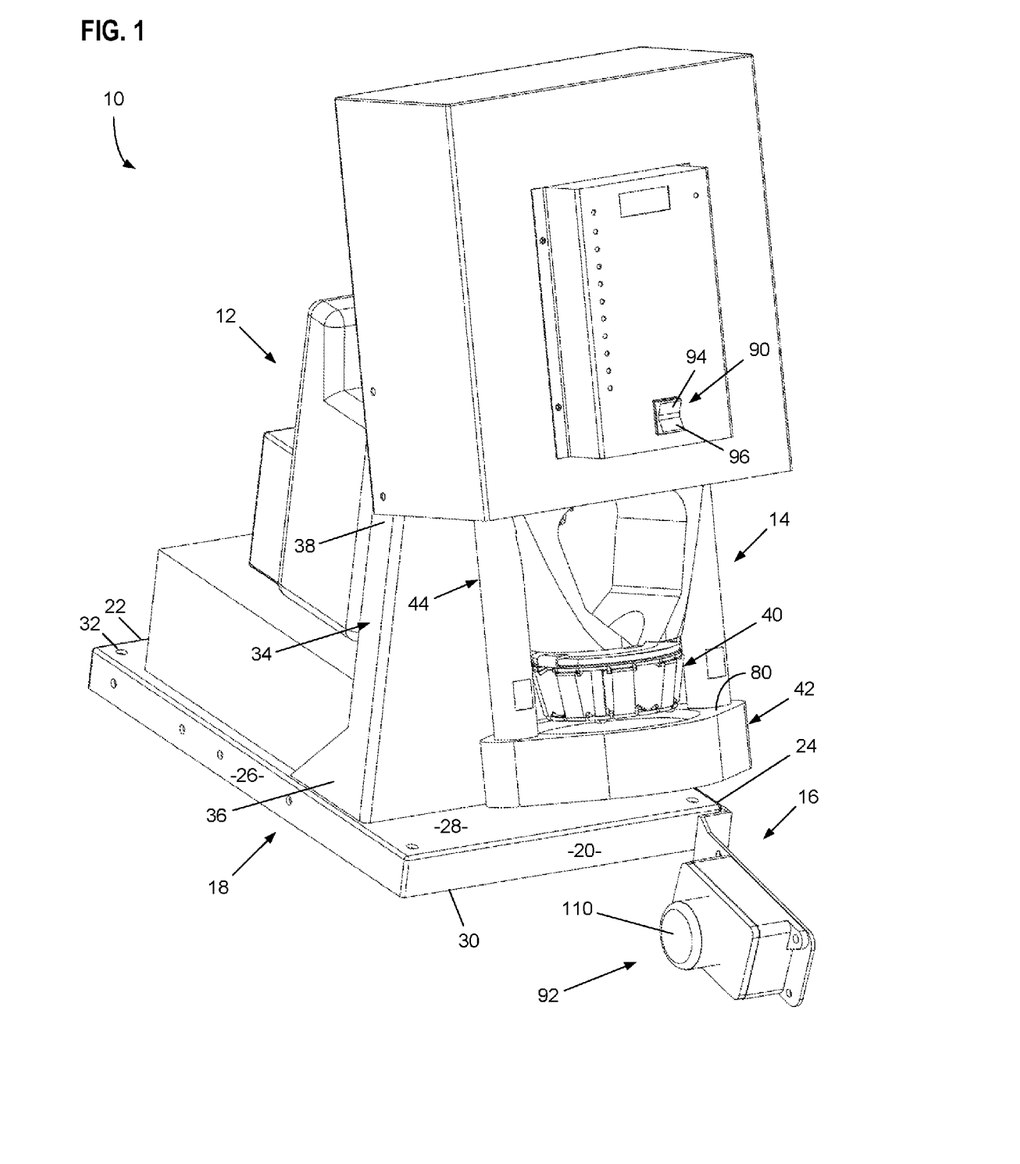
FIG. 1 is an isometric view of a press apparatus having exemplary features of aspects in accordance with the principles of the present disclosure.

Referring now to FIG. 1, a press apparatus 10 is shown. In the depicted embodiment, the press apparatus 10 is a crimping machine that is used to join a fitting assembly 120 (shown in FIG. 8) to a hose 122 (shown in FIG. 8). The press apparatus 10 includes a body 12 having a press assembly 14 and an activation assembly 16 for activating the press assembly 14.

Referring now to FIGS. 1-4, the body 12 includes a base 18. In the depicted embodiment, the base 18 is generally rectangular in shape. The base 18 includes a first end surface 20, an oppositely disposed second end surface 22, a first side surface 24 and an oppositely disposed second side surface 26. The first and second side surfaces 24, 26 extend from the first end surface 20 to the second end surface 22. In the depicted embodiment, the first and second side surfaces 24, 26 are generally perpendicular to the first and second end surfaces 20, 22. The base 18 further includes a first surface 28 and an oppositely disposed second surface 30. Each of the first and second surfaces 28, 30 extends between the first and second end surfaces 20, 22 and the first and second side surfaces 24, 26 of the base 18. The base 18 defines a plurality of mounting holes 32 that extend through the first and second surfaces 28, 30. The plurality of mounting holes 32 is adapted for use in mounting the base 18 to a surface.

The body 12 further includes a mounting plate 34. The mounting plate 34 includes a first end 36 and an oppositely disposed second end 38. The first end 36 of the mounting plate 34 is fixed to the base 18. In the depicted embodiment, the mounting plate 34 is fixed to the base 18 such that the mounting plate 34 is disposed adjacent the first end surface 20 of the base 18. In the depicted embodiment, the mounting plate 34 extends outwardly from the first surface 28 of the base 18 in a generally perpendicular direction.

In the depicted embodiment, the press assembly 14 is mounted to the second end 38 of the mounting plate 34. In another embodiment, the press assembly 14 is mounted to the base 18. In one embodiment, the press assembly 14 is generally vertically oriented with respect to the base 18. The press assembly 14 is mounted at an angle α relative to the base 18. In the depicted embodiment, the angle α is an oblique angle. In the depicted embodiment, the angle α is greater than or equal to about 45°. In another embodiment, the angle α is greater than or equal to about 60°.

The press assembly 14 includes a die assembly 40, a crimp ring 42, a plurality of tie rods 44 and a cylinder (not shown). As previously provided, the press assembly is configured to crimp a fitting assembly to a hose.

Figure 3:
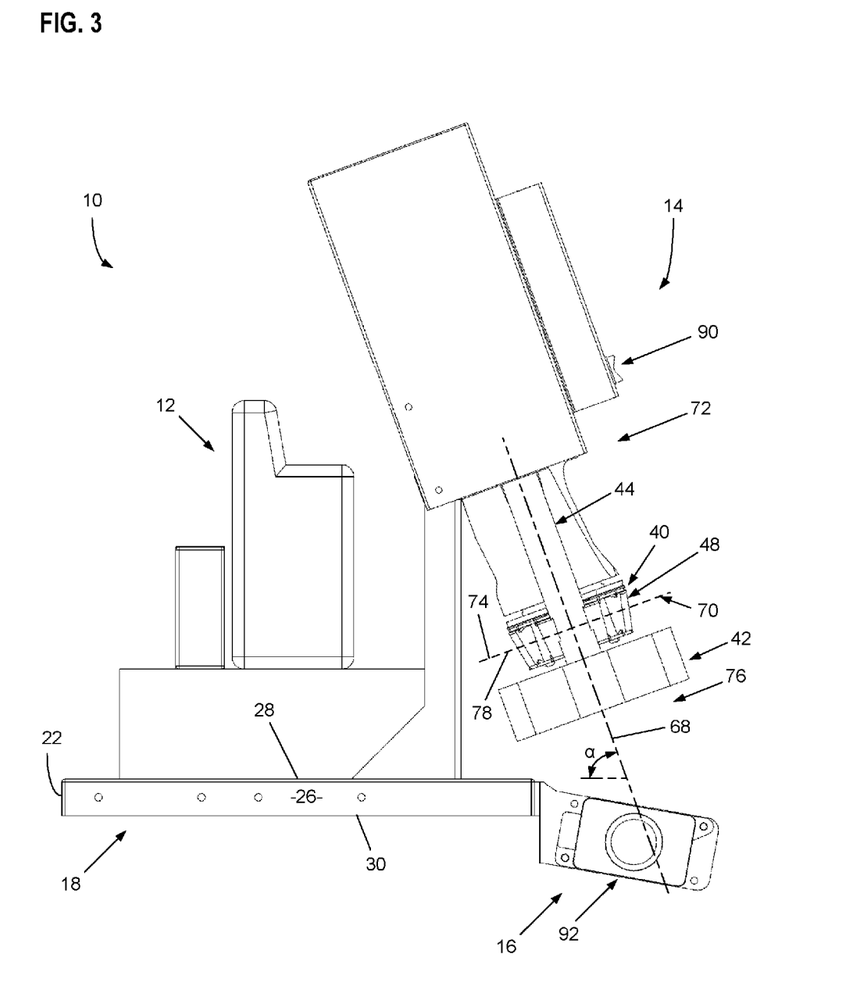
FIG. 3 is a right side view of the press apparatus of FIG. 1.
Figure 4:
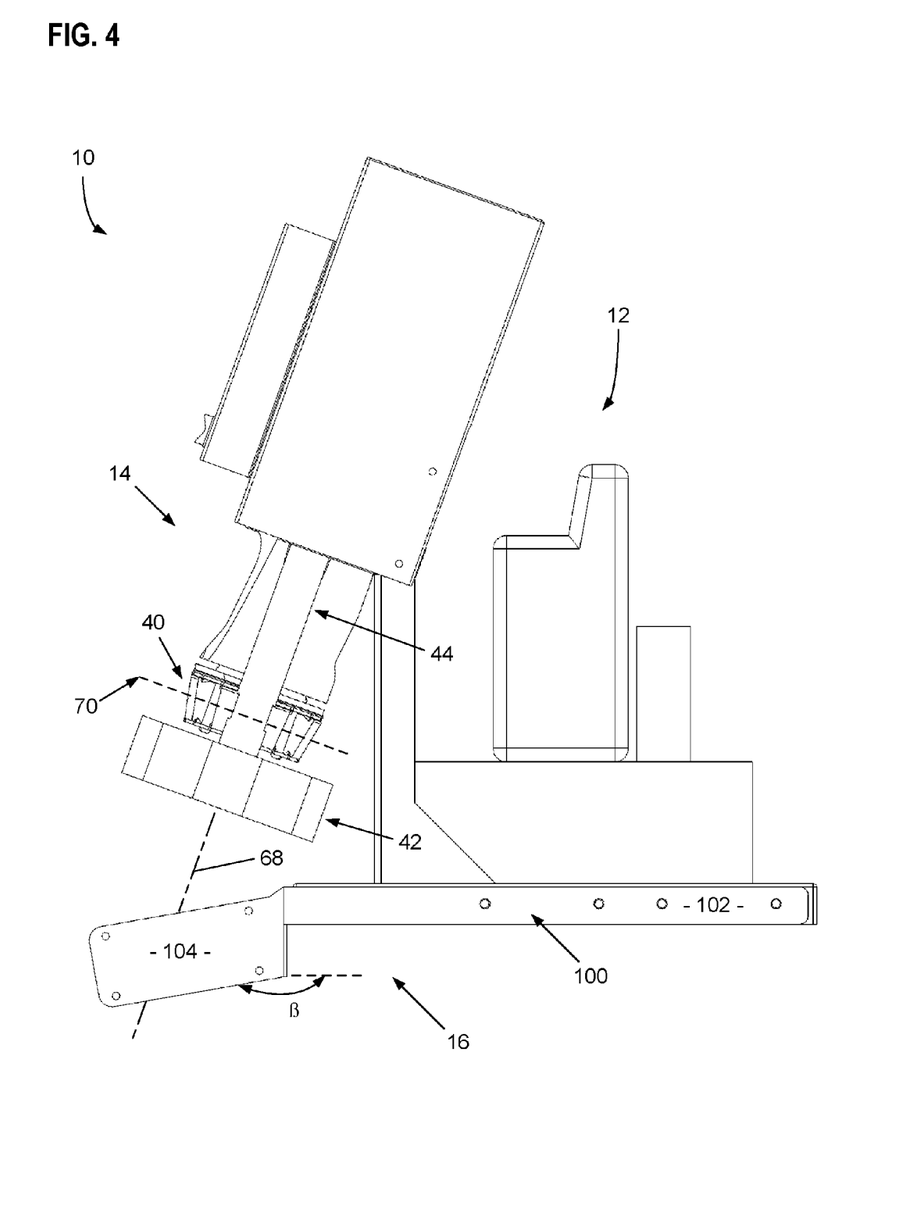
FIG. 4 is a left side view of the press apparatus of FIG. 1.
Figure 5:
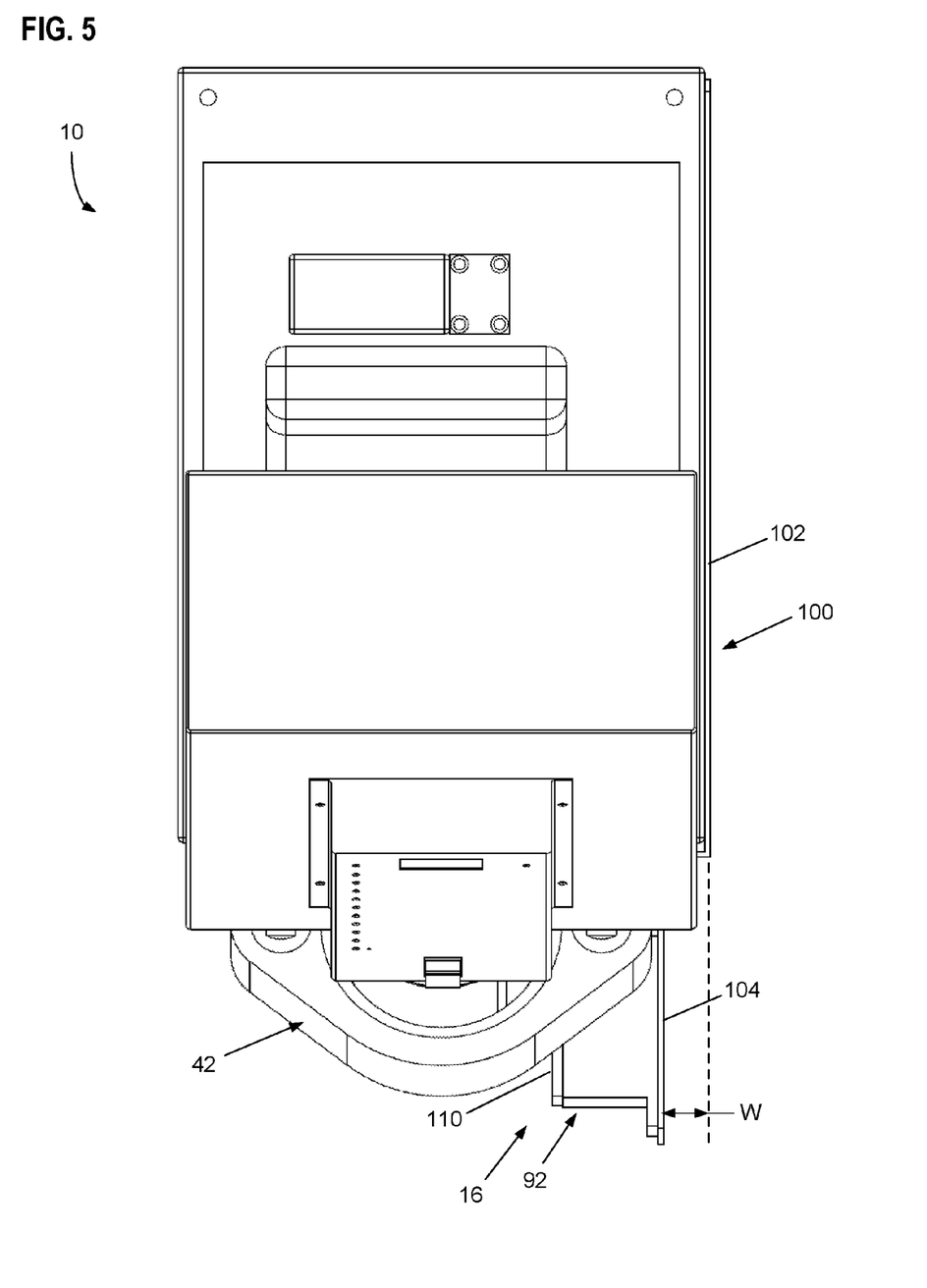
FIG. 5 is a top view of the press apparatus of FIG. 1.
Figure 6:
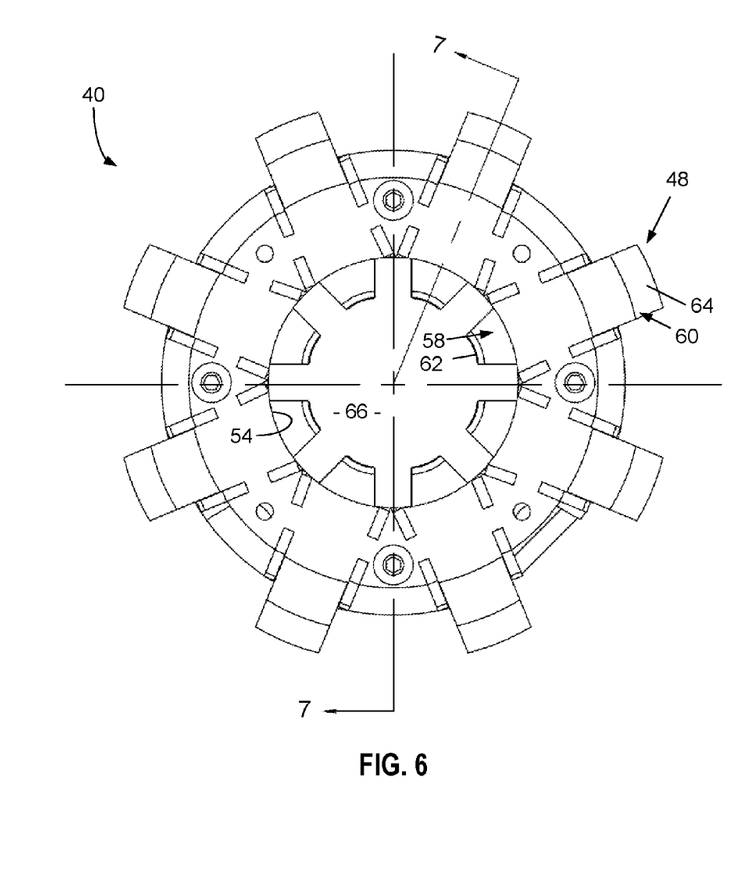
FIG. 6 is a top view of a die assembly that is suitable for use with the press apparatus of FIG. 1.
Figure 7:
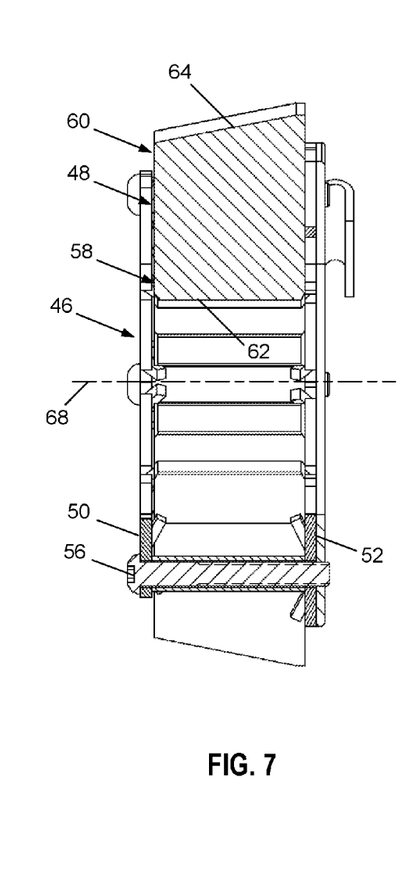
FIG. 7 is a cross-sectional view of the die assembly of FIG. 6 taken on line 7-7 of FIG. 6.

Referring now to FIGS. 3, 6 and 7, the die assembly 40 of the press assembly 14 will be described. The die assembly 40 of the press assembly 14 includes a die cage 46 and a plurality of dies 48.

The die cage 46 includes a first plate 50 and a second plate 52. Each of the first and second plates 50, 52 defines a central opening 54. The first plate 50 is disposed at an offset relative to the second plate 52 via a plurality of fasteners 56.

Each of the plurality of dies 46 includes a first axial end 58 and an oppositely disposed second axial end 60. The first axial end 58 includes a crimp surface 62. In the depicted embodiment, the crimp surface 62 has an arcuate shape. The second axial end 60 includes an actuation surface 64. In the depicted embodiment, the actuation surface 64 is tapered.

The plurality of dies 48 is symmetrically disposed in the offset between the first and second plates 50, 52. The plurality of dies 48 are adapted to selectively reciprocate in the die cage 46 between a retracted position and a crimp position. In the retracted position, the first axial ends 58 of the dies 48 extend into the central openings 54 of the first and second plates 50, 52 while the second axial ends 60 extend beyond an outer diameter of each of the first and second plates 50, 52. In the retracted position, the plurality of dies 48 defines a center opening 66 that is adapted to receive an end portion of a hose assembly 118 (shown in FIG. 8). The center opening 66 defines a central longitudinal axis 68.

In the crimp position, the first axial ends 58 of the dies 48 move radially inward into the central openings 54 of the first and second plates 50, 52. In the crimp position, the center opening 66 defined by the plurality of dies 48 has a circumference that is smaller than the circumference of the center opening 66 in the retracted position.

The die assembly 40 defines a plane 70 that extends through the first and second axial ends 58, 60 of the dies 48. The plane 70 is perpendicular to the central longitudinal axis 68. The plane 70 separates the press apparatus 10 into a first region 72 disposed adjacent to a first side 74 of the plane 70 and an oppositely disposed second region 76 disposed adjacent to a second side 78 of the plane 70.

Figure 2:
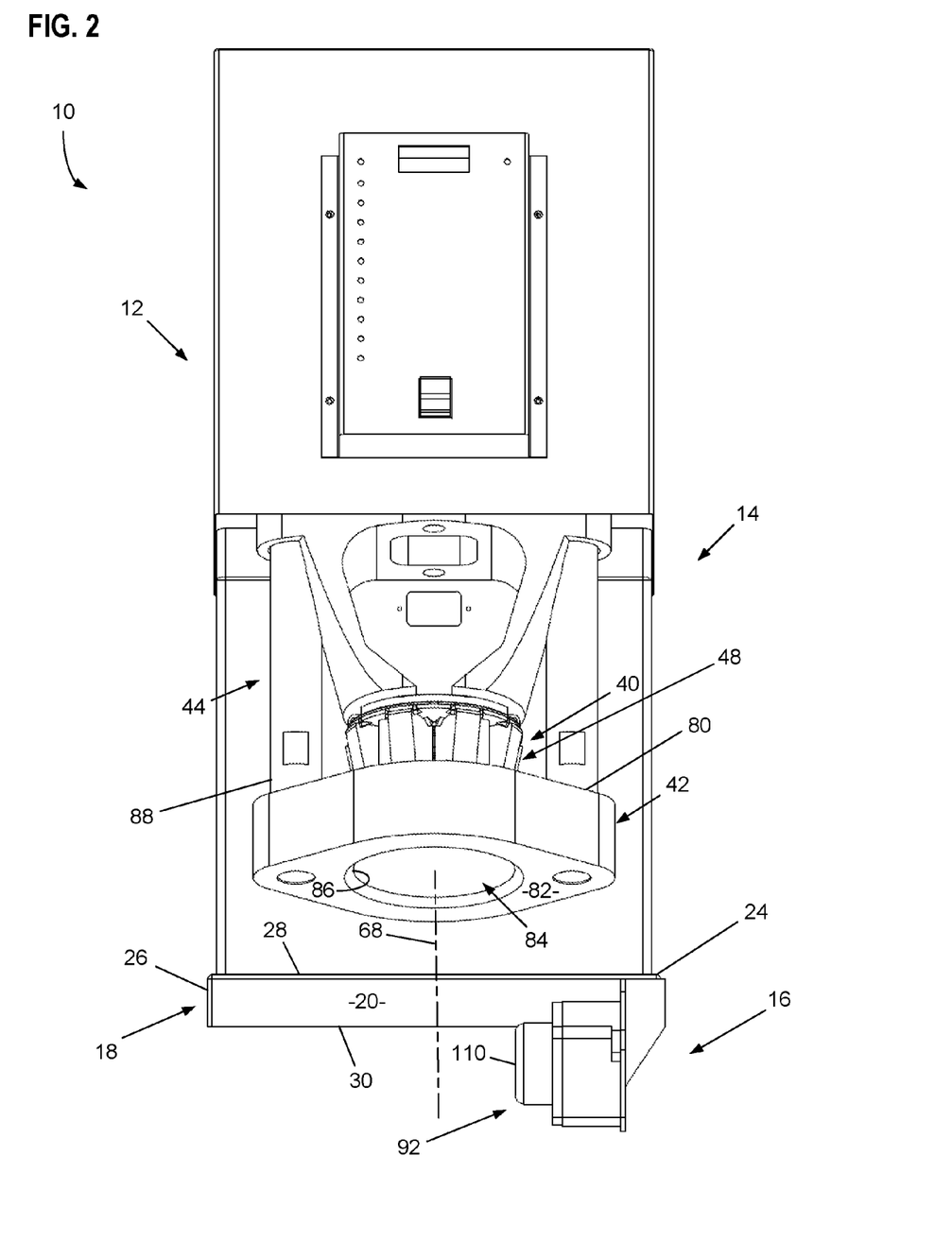
FIG. 2 is a front view of the press apparatus of FIG. 1.

Referring now to FIGS. 2 and 6, the crimp ring 42 includes a first surface 80 and an oppositely disposed second surface 82. The crimp ring 42 defines a central bore 84. The central bore 84 includes an inner surface 86. In the depicted embodiment, the inner surface 86 is tapered so that an inner diameter of the inner surface 86 at the first surface 80 is greater than an inner diameter of the inner surface 86 at the second surface 82. The central bore 84 is adapted to receive the die assembly 40.

The crimp ring 42 is adapted to move between a first position (shown in FIG. 2) and a second position. In the first position, the die assembly 40 is disposed outside of the central bore 74. With the die assembly 40 disposed outside the central bore 74 of the crimp ring 42, the die assembly 40 is in the retracted position. In the second position, the die assembly 40 is disposed at least partially in the central bore 84 of the crimp ring 42. With the die assembly 40 at least partially disposed in the central bore 84 of the crimp ring 42, the inner surface 86 of the crimp ring 42 acts against the actuation surfaces 64 of the second axial ends 60 of the dies 48 to actuate the dies 48 to the crimp position.

The tie rods 44 connect the crimp ring 42 to the cylinder. Each of the tie rods 44 includes a first axial end portion 88 and a second axial end portion (not shown). The first axial end portion 88 is engaged to the crimp ring 42 while the second axial end portion is engaged to the cylinder.

In one embodiment, the cylinder is a hydraulic cylinder that extends and retracts in response to hydraulic fluid being provided to the cylinder. As the cylinder is actuated to the extended position, the tie rods 44 actuate the crimp ring 42 from the first position to the second position thereby actuating the dies 48 of the die assembly 40 from the retracted position to the crimp position.

Referring now to FIGS. 1-5, the activation assembly 16 is adapted to actuate the press assembly 14. The activation assembly 16 includes a first switch 90 and a second switch 92. In order to reduce the risk of injury, the first and second switches 90, 92 must be actuated simultaneously to actuate the press assembly 14.

In one embodiment, the first switch 90 is a rocker switch. In the depicted embodiment, the first switch 90 is a dual direction rocker switch.

In one embodiment, the first switch 90 is disposed within the first region 72 of the press apparatus 10. In the depicted embodiment, the first switch 90 is disposed on the press assembly 14.

The first switch 90 selects the operation mode (e.g., retract or crimp) of the press assembly 14. In the depicted embodiment, the first switch 90 includes a first end portion 94 and an oppositely disposed second end portion 96.

The first switch 90 is in communication with a control circuit of the press apparatus 10. In the depicted embodiment, the first switch 90 is in wired communication with the control circuit. If the first switch 90 is actuated, the first switch 90 sends an electrical signal to the control circuit. In one embodiment, the first switch 90 sends an electrical signal that is representative of the crimp operation if the first end portion 94 is actuated and an electrical signal that is representative of the retract operation if the second end portion 96 is actuated.

In the depicted embodiment, the second switch 92 is mounted to the base 18. The second switch 92 is mounted to the base 18 via a bracket 100. In the depicted embodiment, the bracket 100 is generally longitudinal in shape and includes a first end portion 102 and an oppositely disposed second end portion 104. The second end portion 104 is laterally offset from the first end portion 102. In the depicted embodiment, the second end portion 104 is disposed at an oblique angle ß relative to the first end portion 102 of the bracket 100.

The first end portion 102 of the bracket 100 is mounted to the first side surface 24 such that the second end portion 104 extends outwardly from the first end surface 20 of the base 18. With the second end portion 104 being disposed at an oblique angle ß relative to the first end portion 102, at least a portion of the second end portion 104 extends outwardly from the second surface 30 of the base 18. With the second end portion 104 being disposed at a lateral offset W (shown in FIG. 5) relative to the first end portion 102, the second end portion 104 is disposed between the first and second side surfaces 24, 26 of the base 18.

The second switch 92 is mounted to the second end portion 104 of the bracket 100. The second switch 92 includes a touch surface 110. In the depicted embodiment, the touch surface 110 is a capacitive touch surface. The touch surface 110 of the second switch 92 does not require the operator to apply pressure or force to the touch surface 110 to actuate the second switch 92 but rather simply touch the touch surface 110 to actuate the second switch 92. In one embodiment, the TouchStart® Palm Button provided by Omron Automation & Safety is suitable for use as the second switch 92. The second switch 92 is mounted to the body 12 of the press apparatus 10 so that an operator of the press apparatus 10 can actuate the second switch 92 with a hand that is holding a work-piece being manipulated by the press apparatus 10. In the depicted embodiment, the second switch 92 is mounted to the body 12 of the press apparatus 10 so that the touch surface 110 faces in a direction toward the central longitudinal axis 68 defined by the plurality of dies 48.

In one embodiment, the second switch 92 is disposed within the second region 76 of the press apparatus 10. With the first switch 90 in the first region 72 and the second switch 92 in the second region 76, the die assembly 40 is disposed between the first and second switches 90, 92.

The second switch 92 is in communication with the control circuit of the press apparatus 10. In one embodiment, the second switch 92 is in wired communication with the control circuit. When the touch surface 110 of the second switch 92 is actuated, the second switch 92 sends an electrical signal to the control circuit.

The control circuit will only actuate the press assembly 14 while the first and second switches 90, 92 are actuated. This requirement reduces the risk of injury to the operator while operating the press apparatus 10.

Referring now to FIGS. 6-11, a method 200 of operating the press apparatus 10 will be described. In the depicted embodiment, the press apparatus 10 is adapted to crimp a hose assembly 118.

Figure 8:
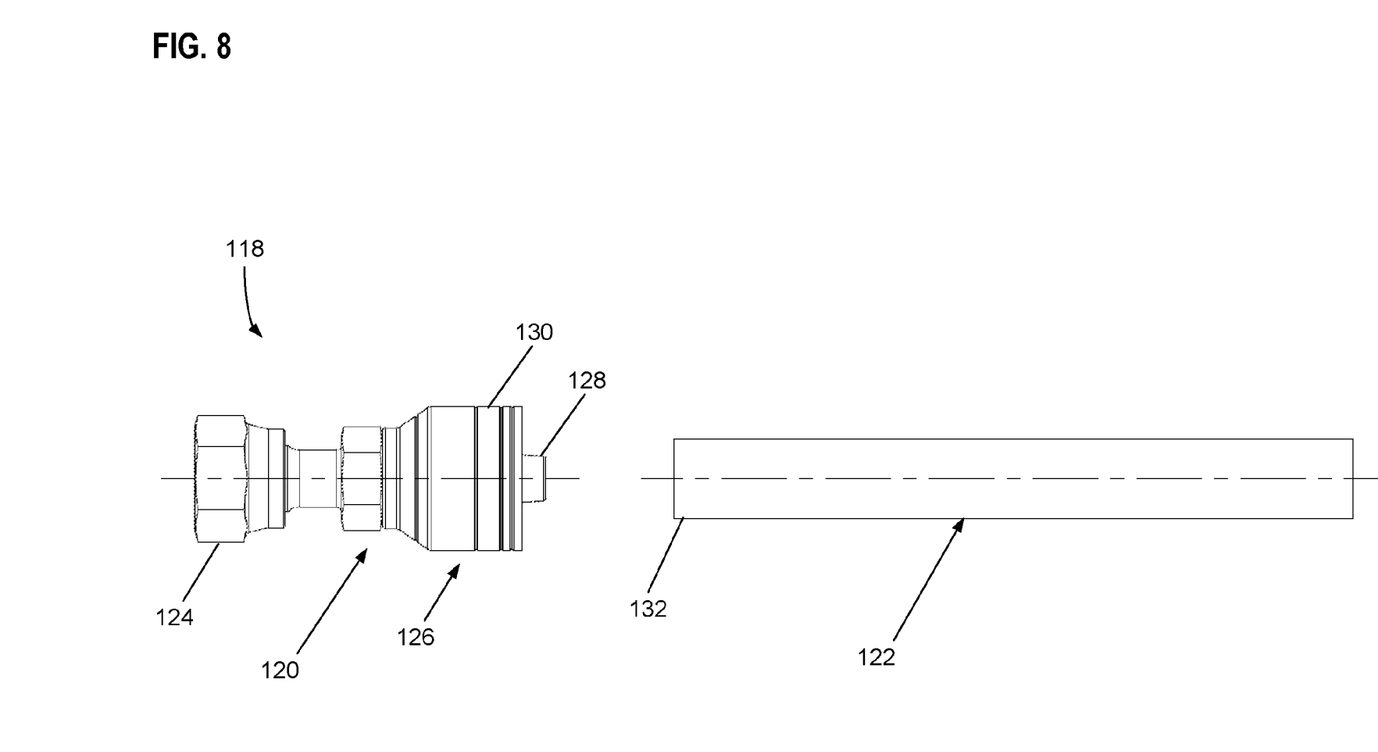
FIG. 8 is an exploded view of a hose assembly.

The hose assembly 118 includes a fitting assembly 120 and a hose 122. The fitting assembly 120 includes first end 124 and an oppositely disposed second end 126. The first end 124 includes a nipple 128 and a socket 130 disposed at least partially around the nipple 128.

Figure 11:
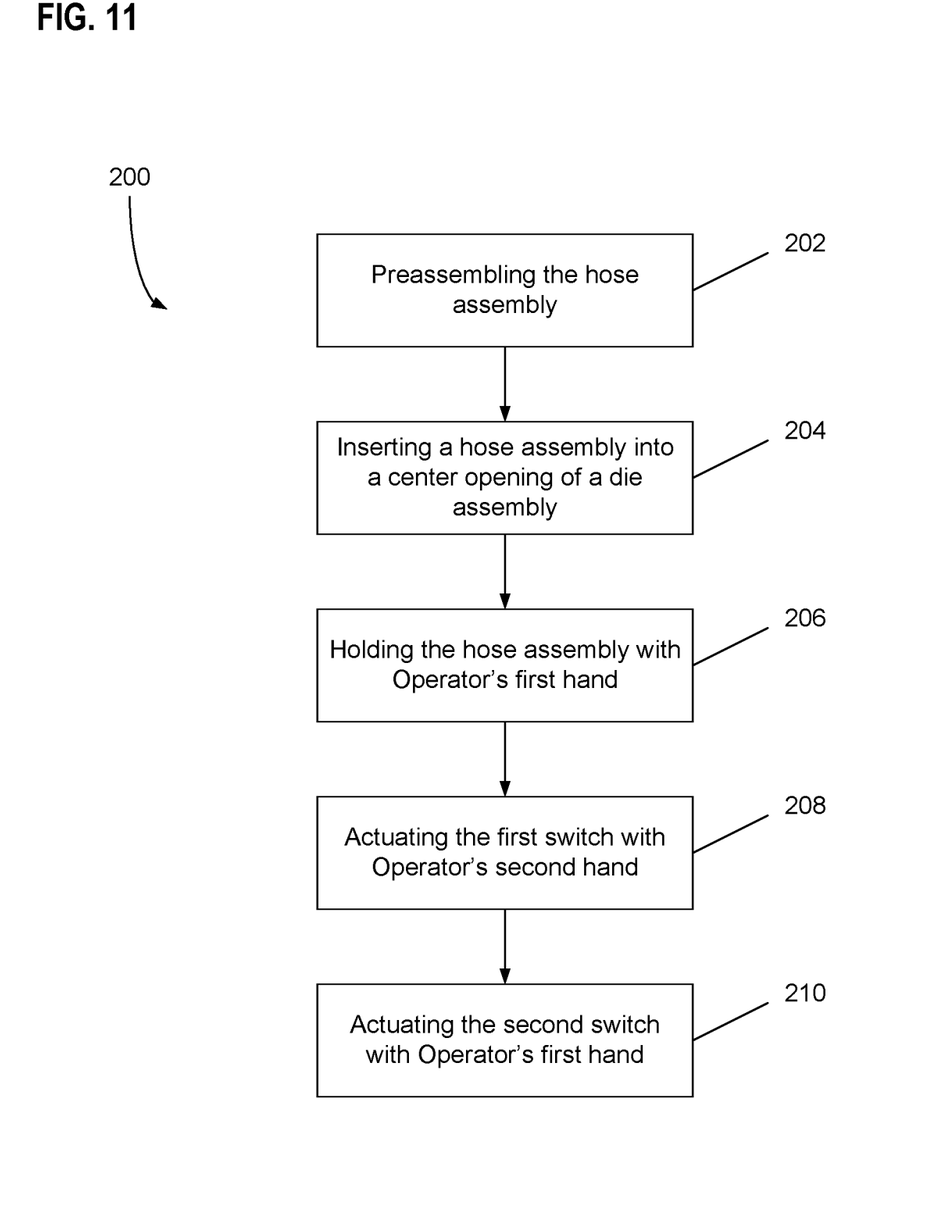
FIG. 11 is a representation of a method for operating the press apparatus.

In step 202, the fitting assembly 120 is preassembled to the hose 122. In the depicted embodiment, the fitting assembly 120 is preassembled to the hose 122 by inserting the nipple 128 of the first end 124 of the fitting assembly 120 into a thru bore (not shown) of an end 132 of the hose 122. With the nipple 128 disposed in the thru bore of the hose 122, the socket 130 is disposed around the end 132 of the hose 122.

With the plurality of dies 48 in the retracted position, the fitting assembly 120 and the hose 122 of the hose assembly 118 are inserted into the center opening 66 of the plurality of dies 48 in step 204. With the plurality of dies 48 in the retracted position, the fitting assembly 120 and the hose 122 are not secured in the center opening 66. Therefore, to properly position the hose assembly 118 in the center opening 66, the operator holds a portion of the hose assembly 118 that is axially offset from the die assembly 40 with the operator's first hand 134 in step 206.

In step 208, the operator actuates the first switch 90 with the operator's second hand (not shown). In the depicted embodiment, the operator would actuate the first switch 90 by pressing the first end portion 94 of the first switch 90 for the crimping operation.

Figure 9:
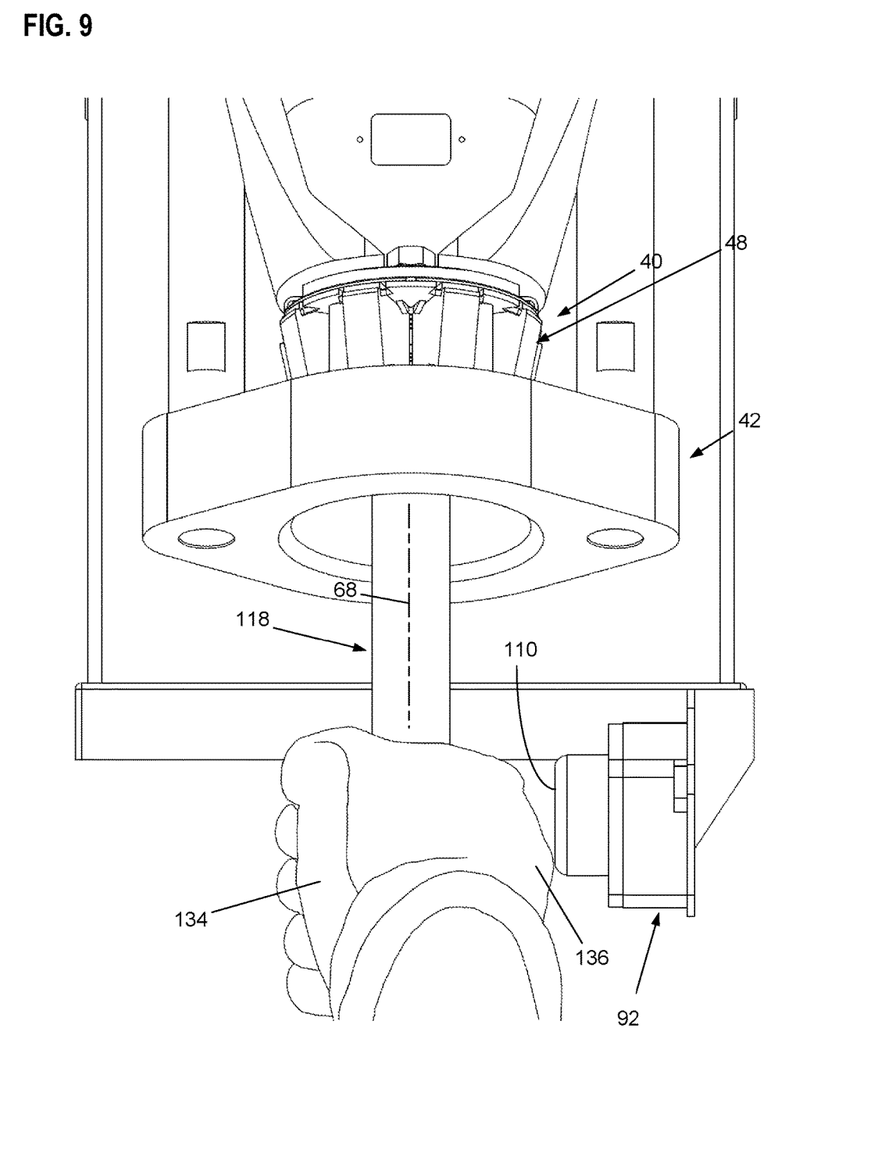
FIG. 9 is an enlarged front view of the press apparatus of FIG. 1.
Figure 10:
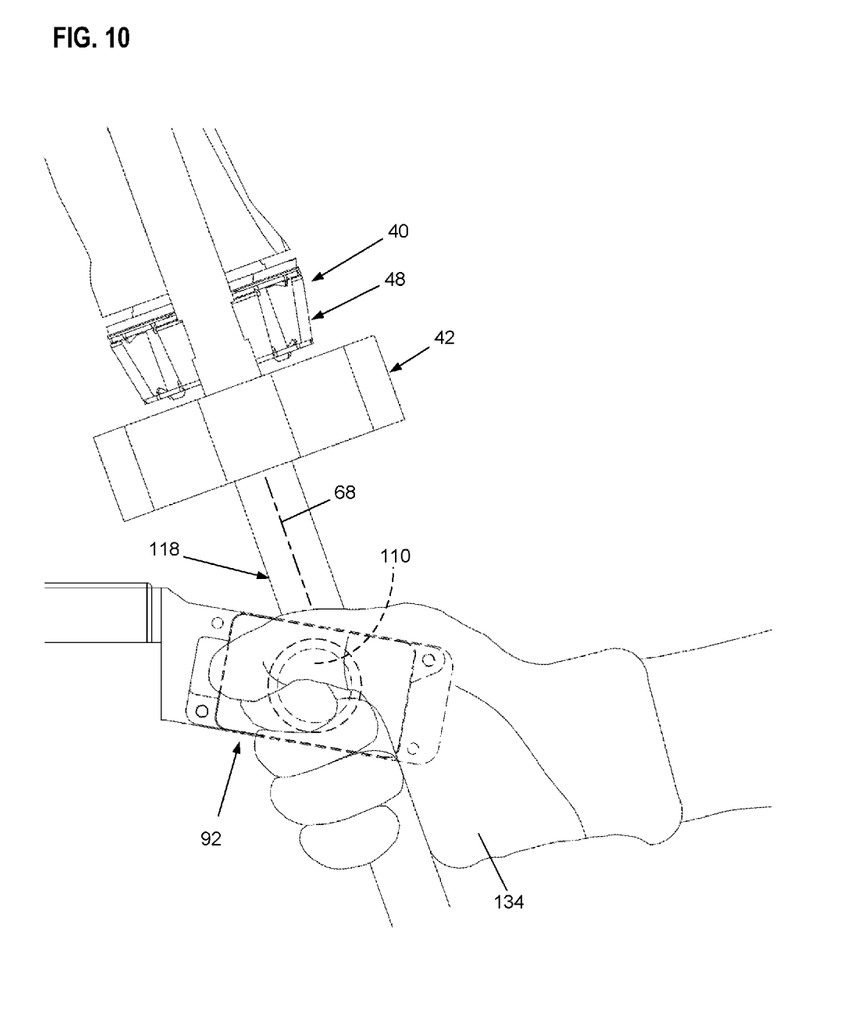
FIG. 10 is an enlarged right side view of the press apparatus of FIG. 1.

With the first switch 90 being actuated with the operator's second hand, the operator touches the touch surface 110 of the second switch 92 with the operator's first hand 134 that is simultaneously grasping the portion of the hose 122 in step 210. In the depicted embodiment, the operator touches the touch surface 110 of the second switch 92 with a back 136 of the operator's first hand 134. With the operator's second hand actuating the first switch 90 and the operator's first hand 134 actuating the second switch 92, the operator's first and second hands are clear of the plurality of dies 48 thereby reducing the risk of injury to the operator.

With both the first switch 90 and the touch surface 110 of the second switch 92 being actuated, the cylinder is actuated so that the crimp ring 42 moves from the first position to the second position thereby actuating the dies 48 of the die assembly 40 from the retracted position to the crimp position. As the die assembly 40 moves to the crimp position, the crimp surfaces 62 of the dies 48 contact the socket 130 of the fitting assembly 120 and compress the socket 130 so that the socket 130 is pressed against the hose 122 thereby retaining the hose 122 between the nipple 128 and the socket 130 of the fitting assembly 120.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A press apparatus comprising:
a press assembly including a plurality of dies, the plurality of dies defining a center opening for receiving a work piece, the center opening defining a central longitudinal axis; and
an activation assembly adapted to actuate the press assembly, the activation assembly including a first switch and a second switch, the second switch includes a capacitive touch surface that faces in a direction toward the central longitudinal axis of the press assembly;
wherein the plurality of dies defines a plane that extends through the plurality of dies and is perpendicular to the central longitudinal axis, the plane separating the press assembly into a first region and an oppositely disposed second region, the first switch being disposed in the first region of the press assembly and the second switch being disposed in the second region of the press assembly.

2. The press apparatus of claim 1, wherein the press apparatus includes a base, the press assembly being mounted to the base at an oblique angle.

3. The press apparatus of claim 2, wherein the oblique angle is greater than or equal to about 45°.

4. A crimp machine adapted to crimp a hose assembly, the crimp machine comprising:
a press assembly including a plurality of dies, the plurality of dies defining a center opening adapted to receive a hose assembly, the center opening defining a central longitudinal axis, the central longitudinal axis being disposed so that the hose assembly is aligned with the central longitudinal axis when the hose assembly is disposed in the center opening; and
an activation assembly adapted to actuate the press assembly, the activation assembly including a first switch and a second switch, the press assembly being actuated when the second switch is actuated while the first switch is being actuated, the second switch including a touch surface that faces in the direction of the hose assembly when the hose assembly is disposed in the center opening of the plurality of dies;
wherein the plurality of dies defines a plane that extends through the plurality of dies and is perpendicular to the central longitudinal axis, the plane separating the press assembly into a first region and an oppositely disposed second region, the first switch being disposed in the first region of the press assembly and the second switch being disposed in the second region of the press assembly.

5. The press apparatus of claim 1, wherein the work-piece is a hose assembly including a fitting assembly and a hose.

6. The press apparatus of claim 1, wherein the second switch is disposed on the press apparatus so that an operator can actuate the touch surface with a hand that is simultaneously holding the work-piece being manipulated by the press assembly.

7. A crimp machine adapted to crimp a hose assembly, the crimp machine comprising:
- a press assembly including a plurality of dies, the plurality of dies defining a center opening adapted to receive a hose assembly; and
- an activation assembly adapted to actuate the press assembly, the activation assembly including a first switch and a second switch, the press assembly being actuated when the second switch is actuated while the first switch is being actuated, the second switch including a touch surface that faces in the direction of the hose assembly when the hose assembly is disposed in the central opening of the plurality of dies.

8. The crimp machine of claim 7, wherein the crimp machine includes a base, the press assembly being mounted to the base at an oblique angle.

9. The crimp machine of claim 8, wherein the oblique angle is greater than or equal to 45°.

10. The crimp machine of claim 7, wherein the touch surface is a capacitive touch surface.

\* \* \* \* \*